June 1, 1926.
A. M. CURTIS
1,586,879
SUBMARINE CABLE TELEGRAPH SYSTEM
Filed March 29, 1924
2 Sheets-Sheet 1
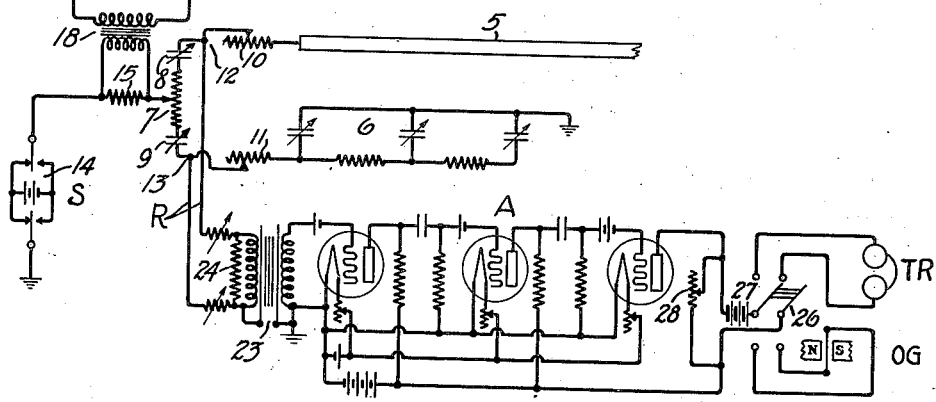
Fig. 1
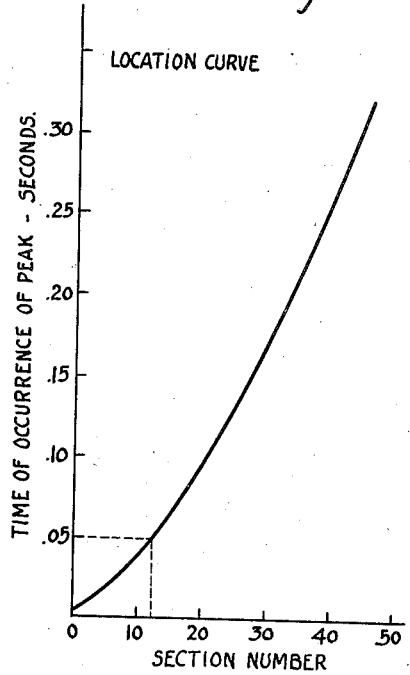
Fig. 2 — LOCATION CURVE
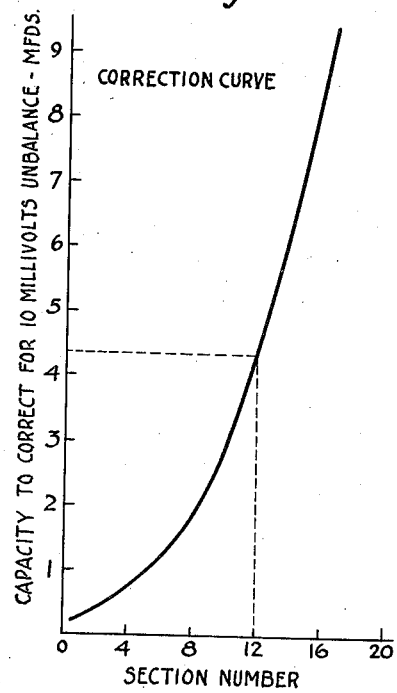
Fig. 3 — CORRECTION CURVE
Inventor:
Austen M. Curtis,
by E. W. Adams, Att'y June 1, 1926.

A. M. CURTIS 1,586,879

SUBMARINE CABLE TELEGRAPH SYSTEM

Filed March 29, 1924      2 Sheets-Sheet 2

Inventor:
Austen M. Curtis
E. W. Adams Att'y

Patented June 1, 1926.

1,586,879

UNITED STATES PATENT OFFICE.

AUSTEN M. CURTIS, OF EAST ORANGE, NEW JERSEY, ASSIGNOR TO WESTERN ELECTRIC COMPANY, INCORPORATED, OF NEW YORK, N. Y., A CORPORATION OF NEW YORK.

SUBMARINE-CABLE TELEGRAPH SYSTEM.

Application filed March 29, 1924. Serial No. 702,769.

This invention relates to a method of and means for balancing a submarine telegraph cable against an appropriate artificial line.

In any system of duplex telegraphy, it is necessary in order to secure good duplex operation to have an artificial cable which possesses substantially the same electrical properties as the main cable. This is so because the current flowing into the artificial cable must be approximately equal to that flowing into the main cable at each instant after the closing of the key. Furthermore, the discharge currents must be the same at each instant after grounding the cable. In other words, the artificial cable must offer the same sending end impedance to currents of all essential frequencies as the main cable. As is well known, there are wide differences in the capacity and the resistance per nautical mile of different ocean cables and the artificial cables used for duplexing are, therefore, always built to suit the capacity and the resistance of each particular cable. These artificial cables, however, cannot be manufactured so as to be exactly equivalent to the real cable as laid, partly because of the variations in the cable during manufacture and partly because of the changes in the capacity depending on the pressure to which it is subjected under water. Furthermore, the capacity and the resistance of an ocean cable change with the changing temperature of the sea water and the artificial cable itself is affected by temperature changes, consequently frequent adjustments of the artificial cable have to be made.

One method commonly used is to impress one or more impulses of signaling current upon the cable and from the observed shape of the unbalance current wave form as recorded by the receiving instrument estimate from experience the necessary change to be made in the artificial cable. When using this cut and try method it sometimes has taken weeks of labor to effect a working balance. To make such a balance, an experienced electrician is required, and furthermore, the cable must be taken out of service while the adjustment is being made. Consequently, the degree of balance maintained on the ordinary commercial cable is far from that which would permit the most rapid working of the cable.

In Patent No. 1,534,118, granted to H. W. Hitchcock, April 21, 1925, a method is described whereby the number of trials necessary to effect a balance is greatly reduced by the use of oscillograph records. The cable time required in applying this method is materially reduced, although the time required to analyze the record and effect the balance is still considerable.

An object of this invention is to reduce still further the cable time required to effect a balance and also to disclose a method of procedure which will permit a relatively unskilled operator to obtain a satisfactory working balance in a few minutes.

Another object is to obviate the necessity for experience on the part of the operator and to substitute therefor mere ability to make observations and to apply simple rules.

A further object is to transmit without serious distortion through an inductive coupling the low frequencies involved in submarine telegraphy.

In accordance with this invention, head end balance is determined by means of a multi-frequency oscillator and a telephone receiver. The telephone receiver is associated with the receiving terminals of the duplex bridge through an amplifier, if necessary, while the oscillator which produces current of square topped wave form is associated with the transmitting terminals of the duplex bridge. The fundamental frequency of the current supplied by the oscillator is of such value that, due to the attenuation of the test current, the parts of the real cable and artificial cable electrically distant from the head end, have substantially no effect in determining the current which will flow in the receiver. When the head end circuit elements are so adjusted that a minimum tone is heard in the telephone receiver, head end balance is effected.

Distant unbalances are determined by the impulse method wherein the time of occurrence and amplitudes of the principal peaks of the unbalance current are utilized. Two calibration curves are employed. The location of an unbalance is obtained from one of these curves which shows the location as a function of the time of occurrence of a principal peak. The amount of change required is obtained from the other curve which shows the amount required as a function of the amplitude of the peak. The direction of change required is determined by the polarity of the peak of the unbalance voltage, that is, a positive peak might indicate an increase in capacity at a certain position in the artificial line and vice versa. In order to obtain a true record of the unbalance voltage wave form, a transformer having a primary coil of high time constant, shunted by low resistance is employed to connect the receiving amplifier and oscillograph to the receiving terminals of the duplex bridge.

It is sometimes desired to use a terminal balanced bridge arrangement in a simplex telegraph system in which the direction of transmission is reversed at intervals. In this way the discharge of the cable through the receiving apparatus at the end of each transmitting interval is reduced or eliminated. Such a system is disclosed in a copending application of J. J. Gilbert, Serial No. 561,138, filed May 15th, 1922. This invention is also applicable to such a system.

The novel features which are considered characteristic of this invention are set forth with particularity in the appended claims. The invention, both as to its organizations and method of operation together with other objects and advantages thereof, will be further explained in the following description having reference to the accompanying drawing consisting of the following figures.

Fig. 1 is a diagrammatic illustration of one embodiment of the invention.

Fig. 2 is a curve showing the relation between the location of an unbalance and the time of occurrence of a principal peak of the unbalance current wave form.

Fig. 3 is a curve showing the amount of capacity change required to correct for a ten milli-volt unbalance at any given location.

Figure 4:
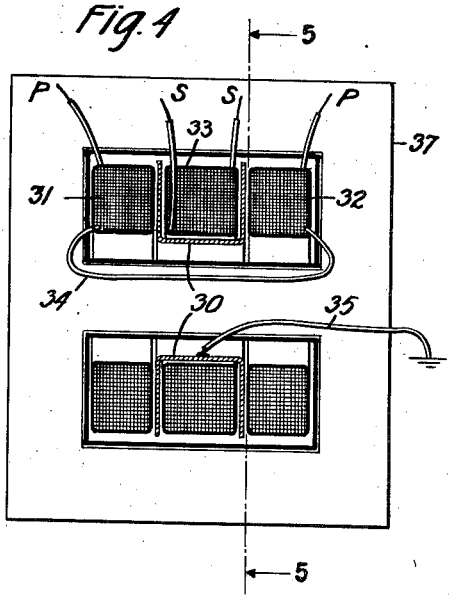
Figure 5:
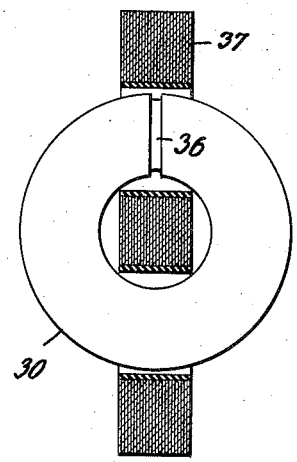
Figure 6:
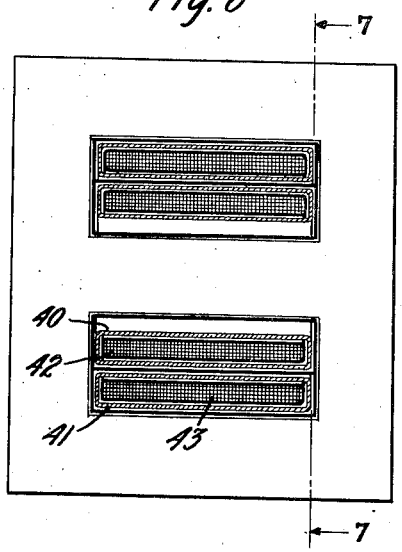
Figure 7:
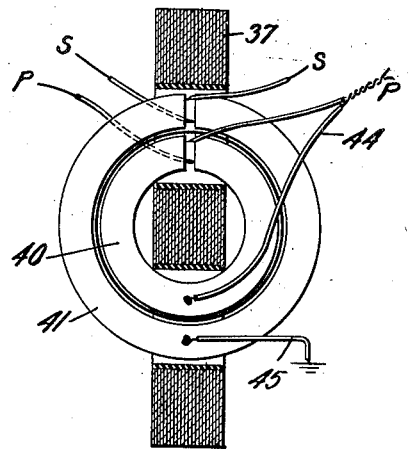

Figures 4 to 7 inclusive, illustrate details of two ways of shielding the transformer which connects the amplifier to the bridge. Fig. 5 is a section at 5, 5 of Fig. 4 and Fig. 7 is a section at 7, 7 of Fig. 6.

Referring now to Fig. 1, a cable 5, and an artificial cable 6 are shown connected to sending apparatus S and receiving circuit R in the form of a well known duplex bridge. The apex resistance 7 and block condensers 8 and 9 are connected in the usual manner to form arms of the duplex bridge. Variable resistance 10 is connected between the cable and receiving terminal 12 of the bridge, while the variable resistance 11 is connected between the artificial cable 6 and the receiving terminal 13 of the bridge.

The sending apparatus S is a well known type whereby either positive or negative potentials from the battery 14 may be impressed upon the apex of the bridge.

The artificial cable 6 is shown schematically as made up of three sections, each consisting of series resistance and shunt capacity to ground. In any actual case, however, a much larger number of sections would be employed, but for purposes of illustration, it is only necessary to show that the artificial line is made up of various sections. The output circuit of a test oscillator O is connected in series with the sending apparatus S between the apex of the duplex bridge and ground by means of resistance 15.

The oscillator O is so designed as to give a substantially square topped wave form having a fundamental frequency of approximately 50 cycles per second. As illustrated it consists of two three-element electron discharge devices 16 and 17 and a plurality of condensers and resistances connected together as shown. The generated oscillations are impressed upon the resistance 15 by means of a transformer 18. Condensers 19, 19 which are connected between the grid of one device and the plate of the other, each have a capacity of 0.15 microfarad. Resistances 20, 20 which are connected between the grids and filaments of the electron discharge devices are each of 200,000 ohms. The resistances 21, 21 which are connected in the plate circuits of the electron discharge devices each has a value of 12,000 ohms, while the resistances 22, 22 also connected in the plate current paths, have values of 1,200 ohms. Electron discharge devices manufactured by Western Electric Company, Inc., and designated as No. 210-A vacuum tubes are preferably used for devices 16 and 17. They are energized by suitable source of filament and plate current.

Connected to the receiving circuit R of the duplex bridge is the receiving apparatus. For telegraph transmission this same apparatus may be used or a siphon recorder may be substituted therefor. The receiving apparatus illustrated consists of a specially constructed transformer 23, a three-stage electron discharge amplifier A and a receiving instrument which may be either a telephone receiver TR or an oscillograph recorder OG.

Transformer 23 is designed to faithfully transmit the wave form of the current flowing in the receiving circuit R to the amplifier A, down to frequencies as low as are required to effect a working balance. If a transformer has a primary coil with a large time constant shunted by a low resistance and the secondary coil is open-circuited, the primary current will be inversely proportional to the rate of change of the voltage impressed upon it. As the induced secondary voltage is directly proportional to the rate of change of the primary current, it will have the same form as the impressed primary voltage, for all components of the impressed wave whose period is considerably shorter than the time constant of the primary winding. The transformer 23 with its primary circuit operates on this principle. The primary coil has an inductance of 600 henrys and a resistance of about 150 ohms, with a turns ratio as high as practical. A resistance 24 of 50 ohms is bridged across the primary coil giving a time constant of three seconds for the transformer. It is necessary to prevent the transformer 23 from unbalancing the duplex bridge by providing that the impedance from each terminal of its primary winding to earth is the same for all frequencies. This may be accomplished by shielding the primary from the secondary in either of two ways.

In Figs. 4 and 5 the transformer is shown with a single grounded shield 30 between the primary and secondary windings. In this case precautions must be taken to wind the primary coils in such a manner that the impedance of any point in the primary winding to the shield is the same as that of the symmetrically opposite point of the winding, that is, the primary winding is balanced to the shield. The primary winding consists of two sections 31 and 32, one located on either side of the secondary winding 33. The primary sections are connected series aiding by the lead 34. The external terminals of the primary winding are indicated at P, P. The terminals of the secondary winding are indicated at S, S. The shield 30 is provided with a slot 36 to prevent it from acting as a short-circuited turn on the core 37 and is grounded at a midpoint opposite the slot by the conductor 35.

In Figs. 6 and 7 the preferred method of using a double shielded transformer is illustrated. The transformer is provided with two shields 40 and 41, both split to prevent them forming short circuited windings, and well insulated from each other and from the windings and core of the transformer. The shield 40 nearest the primary winding 42 is connected to one terminal of that winding by conductor 44, and the shield 41 nearest the secondary winding 43 is grounded through conductor 45. The points at which the connections to the shields are made are chosen so as to be equidistant from either edge of the slot in the shield. This is for the purpose of insuring that the displacement currents which flow from the primary winding through the shields to earth, divide equally in each half of the shields and thus produce no induced current in the secondary winding. The terminals of the primary winding are indicated at P, P and those of the secondary at S, S.

The amplifier A is resistance coupled as shown and is substantially distortionless. The constants of the circuit elements are so designed as to produce a total time constant for the transformer 23 and amplifier A of 2 seconds.

A switch 26 is provided so that either the telephone receivers TR or the string oscillograph OG may be connected to the output of the amplifier A. Battery 27 and variable resistance 28 are provided to compensate for the normal plate current flowing in the last electron discharge device when no voltage is impressed upon the amplifier A from the receiving circuit R. The resistance 28 is several times as high as that of the string oscillograph. The oscillograph OG is a modified string galvanometer of well known type. The cell of the oscillograph is designed to hold the wire immersed in a liquid. By using a .0004 tungsten string of about 70 ohms resistance and a damping liquid consisting of carbon tetrachloride satisfactory sensitivity and damping are obtained. The string is slightly less than critically damped when adjusted to a tension which makes its natural frequency in air about 600 periods per second. Under these conditions, it gives a sensibly equal deflection for frequencies up to 200 periods per second and a peak current of one milliampere gives a peak deflection from zero to 0.5 millimeter. The combination of amplifier and string oscillograph just described, gives, almost instantaneously, automatically developed oscillograms marked off in hundredths of a second. The time marking is provided by a shutter, driven by a synchronous motor which shuts off the light for a brief interval every one hundredth of a second.

With the switch 26 thrown upward, the telephone receiver TR is connected to the output of the amplifier A, thus permitting the detection of any audible components of an unbalance wave.

In order to determine the proper correction to apply to a duplex system, which produces a certain unbalance wave as shown by an oscillograph record, it is necessary to have a knowledge of the location, amplitude and polarity of the peak caused by any known source of unbalance. The time of occurrence of a peak is dependent upon the location of the source of unbalance, while the amplitude is proportional to the magnitude of the source of unbalance, the proportionality factor being dependent upon the location. The polarity is determined by whether the unbalance is caused by an element of the artificial cable being larger or smaller than the corresponding section of the cable. Sufficient oscillograms and measurements of known unbalances are therefore made from which two calibration curves are plotted. The first curve which is shown in Fig. 2 is called a "location curve" and shows the relation between the position of the unbalance on the cable and the elapsed time between the application of the impulse and the occurrence of the peak of the wave. The second curve, shown in Fig. 3 and called the "correction curve", shows the extra amount of capacity which, when transmission is at a certain voltage, will produce an unbalance peak of 10 millivolts, this value of capacity being plotted against its position on the artificial cable. The curves of Figs. 2 and 3 will differ for different types of cables and the correction curve may not necessarily indicate an adjustment of capacity alone.

In commencing to balance a new cable against its artificial line it will usually be found that several serious unbalances exist. While it is possible to determine the positions of the unbalances by computation from the times of arrival of the peaks it is easier to neglect them and make the "location curve" by introducing at various points in the artificial line, unbalances which are large compared to those already existing and noting the time at which the peaks produced arrive at the cable terminal. Then the more serious natural unbalances may be corrected by a cut and try method which involves only a determination of the magnitude of the correction, since the location of the trouble may be obtained by reference to the "location curve". Having thus smoothed out the most important irregularities in the balance, data for the "correction curve" would then be obtained by introducing new unbalances, large in magnitude compared to those already existing in the system, and determining the unbalance voltage which they produce across the duplex bridge corners when a signal of known voltage is applied to the bridge apex.

To facilitate determining the amplitudes of the voltages causing the unbalance current wave form, it is convenient to so arrange the apparatus that a standard voltage is applied to the receiving circuit R independently of the duplex bridge terminal 12, 13 either just before or shortly after the application of an impulse to the duplex bridge by the operation of the sending apparatus S.

Operation.

After the "location curve" of Fig. 2 and the "correction curve" of Fig. 3 have been obtained, the procedure to be followed in correcting an unbalance is as follows:

The multi-frequency oscillator O is energized and test current is impressed upon the duplex cable system. The oscillator O as previously explained, supplies a current of a fundamental frequency of about 50 cycles per second and practically of square topped wave form. Harmonics having frequencies up to several thousand cycles per second are plainly audible in the telephone receiver TR if the head end elements of the bridge arrangement are not perfectly balanced. Moreover, the properties of the ear are such that a change in the tone caused by the reduction or strengthening of certain ranges of frequencies may be easily recognized. Therefore, by listening in the telephone receiver and adjusting the apex resistance 7, the block condensers 8 and 9, and the series resistances 10 and 11 until the tone heard in the telephone receiver is a minimum, a "head end" balance may be quickly obtained. The high frequencies are first balanced out by adjusting the apex resistance 7. Next, the intermediate frequencies are balanced out by adjusting the series resistances 10 or 11 or both. Finally, the lower frequencies are balanced out with the block condensers 8 and 9 or possibly by adjustment of the first few sections of the artificial cable. This adjustment may be made while the local station is sending and should not require more than a minute.

After the head end of the system has been balanced, as just described, the multi-frequency oscillator may be deenergized or disconnected and the oscillograph connected to the amplifier by throwing the switch 26 downward. An oscillogram is taken of the unbalance current wave form due to a single closing of one of the transmitting keys of sending apparatus S. While this is being done, the transmission must be stopped in both directions, but the line time consumed should not exceed a minute. From the oscillogram, the time of occurrence of a principal peak can be easily obtained. The instant of closing the transmitting key at the beginning of the impulse is indicated on the oscillogram by an impulse caused by an inevitable small error in the head end balance. It is therefore not necessary to provide special means to make a starting indication on the recording oscillogram. The location of the principal component of the unbalance can then be determined from the "location curve." Thus, for example, if the elapsed time from the start of the impulse to a principal peak is 0.05 of a second, the unbalance is located at the twelfth section of the artificial cable, as shown by the dotted lines in Fig. 2. From the "correction curve" of Fig. 3, as indicated by the dotted lines, it would take 4.4 microfarads capacity change to cause a 10 milli-volt unbalance at this location. Assume that the recorded unbalance current wave form showed that the actual unbalance is only 2 milli-volts. It would therefore, take two tenths as much capacity change or 0.88 microfarad to correct for the actual unbalance. Whether the correction is to be added to or subtracted from the artificial line is determined from the polarity of the unbalance peak under consideration. After such correction has been made, another oscillogram would be taken requiring another minute of time. If the balance shown is not sufficiently good, the operation must be repeated, each of the subordinate unbalances being located and corrected in its turn.

After the original balance of the cable has been effected an oscillogram of the unbalance wave would be taken at regular intervals during the day. This would serve as a valuable record and indication of the condition of the cable system and would be used to correct unbalances before they became large enough to interfere with the operation of the cable. The time consumed in making such correction would be pactically negligible, requiring not more than a total of three or four minutes of cable time for each complete adjustment.

From the foregoing, it is seen that the necessity for experience on the part of the attendant in estimating the correction required is obviated and there is substituted therefor merely the ability to take oscillograms and use calibration curves. Moreover, the amount of cable time required is reduced to a minimum and the cable maintained at all times with a high degree of balance so that maximum transmitting speeds may be effectively used.

Other embodiments of the invention as defined in the appended claims will be obvious to those skilled in the art.

What is claimed is:

1. The method of adjusting the balance between a submarine cable and an artificial line in a telegraph system which comprises substituting a multi-frequency test current for the ordinary signaling current, producing audible effects by said test current, and improving the balance in accordance with said audible effects.

2. The method of improving the balance between a submarine cable and an artificial line in a telegraph system which comprises applying transmitting battery, recording the wave form of the unbalance voltage resulting from a single application of the transmitting battery, and adjusting the balance in accordance with the time location of the principal peak of the recorded unbalance wave form by an amount dependent upon the amplitude of said peak.

3. The method of adjusting the balance between a submarine cable and an artificial line in a telegraph system which comprises applying in succession a multi-frequency test current and a single impulse of direct current.

4. The method of balancing a submarine cable by means of an artificial line which comprises applying a multi-frequency test current in place of the ordinary signaling current, producing an indication by the test current, adjusting for head-end balance in accordance with the indication produced by the test current, applying a single impulse of current, recording the wave form of the unbalance voltage resulting from the single impulse, and further improving the balance in accordance with this record.

5. In a telegraph system, a bridge arrangement, means to apply to the transmitting terminals of said bridge an alternating current particularly rich in harmonics, said current having a fundamental frequency near the lower limit of audibility in a telephone receiver, means to observe the residual component of said current at the receiving terminals due to unbalance of said bridge, and means to vary the bridge elements to reduce the observed effect.

6. Means to adjust for head end balance in a telegraph system comprising a bridge, a multi-frequency oscillator supplying a current of fundamental frequency of approximately 50 cycles and harmonics up to several thousand cycles, a telephone receiver connected to the receiving circuit, and means to separately adjust the apex resistance, the block condensers and the series resistances of said bridge until the tone heard in the telephone receivers is a minimum.

7. In a telegraph system, a bridge arrangement having a transmitting circuit and a receiving circuit, means to impress multi-frequency current upon said transmitting circuit, said current having a fundamental frequency of approximately 50 cycles per second, and an amplifier connected to said receiving circuit and a telephone receiver connected to said amplifier, and means to adjust the elements of said bridge to substantially eliminate any effect in said receiver from said multifrequency current.

8. Means to effect a balance in a submarine cable telegraph system which comprises, a bridge arrangement, an artificial cable, means to record an unbalance current wave form, a calibration curve showing the position on the artificial cable of an unbalance as a function of the time of occurrence of the peak of the unbalance wave, a second calibration curve showing the amount of adjustment required to cause an unbalance of given amount at any given position on the artificial cable and means to effect a reduction in the unbalance current by changing the constants of the artificial cable both as to position and amount in accordance with the indications of the recorded wave form and said calibration curves.

9. Means to effect a balance in a submarine cable telegraph system which comprises, a submarine cable, an adjustable artificial cable, a bridge connection, means to impress an impulse of current upon said cable as in duplex operation, means to record the unbalance voltage wave form and means to determine the changes required in the artificial line to reduce the unbalance voltage in accordance with the time of occurrence of a principal peak of said unbalance wave and the amplitude and polarity of said peak.

10. In apparatus for balancing a submarine cable, an artificial line, a balancing bridge connection, an electron discharge amplifier, a transformer connecting said amplifier to conjugate points of said bridge, said transformer comprising a primary coil having a time constant several times larger than the lowest period of any of the important components of the unbalance current, and a resistance connected in shunt of said primary coil.

11. In apparatus for balancing a submarine cable, an artificial cable, a duplex bridge circuit, a grounded electron discharge amplifier separated from the bridge by a transformer designed to pass without substantial distortion all principal components of an unbalance wave, said transformer by appropriate shielding between its primary and secondary windings being prevented from unbalancing the duplex bridge circuit.

In witness whereof, I hereunto subscribe my name this 28th day of March A. D., 1924.

AUSTEN M. CURTIS.